US006549937B1

(12) United States Patent
Auerbach et al.

(10) Patent No.: US 6,549,937 B1
(45) Date of Patent: Apr. 15, 2003

(54) SYSTEM AND METHOD FOR MULTI-PROTOCOL COMMUNICATION IN A COMPUTER NETWORK

(75) Inventors: David B. Auerbach, Seattle, WA (US); Benjamin A. Mejia, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/358,202

(22) Filed: Jul. 21, 1999

(51) Int. Cl.[7] .................... G06F 15/16

(52) U.S. Cl. .................... 709/206; 709/230

(58) Field of Search .................... 709/206, 207, 709/230, 246

(56) References Cited

U.S. PATENT DOCUMENTS 4,855,906 A * 8/1989 Burke .................... 340/870.16
5,278,955 A * 1/1994 Forte et al. .................... 703/26
5,706,286 A * 1/1998 Reiman et al. .................... 370/401
5,793,771 A * 8/1998 Darland et al. .................... 370/467
5,802,454 A * 9/1998 Goshay et al. .................... 340/7.25
6,058,422 A * 5/2000 Ayanoglu et al. .................... 709/226
6,064,723 A * 5/2000 Cohn et al. .................... 379/88.14
6,138,096 A * 10/2000 Chan et al. .................... 704/200
6,205,432 B1 * 3/2001 Gabbard et al. .................... 705/1
6,272,341 B1 * 8/2001 Threadgill et al. .................... 455/428
6,301,609 B1 * 10/2001 Aravamudan et al. .................... 707/1
6,463,078 B1 * 10/2002 Engstrom et al. .................... 370/466

* cited by examiner

*Primary Examiner*—Mehmet B. Geckil
(74) *Attorney, Agent, or Firm*—Woodcock Washburn LLP

(57) ABSTRACT

A system for multi-protocol communication in the computer network has a user interface layer with a common data structure to permit instant messaging communication with multiple service providers that each have different communication protocols. Message data and commands are transferred to a conversion platform layer using an application programming interface (API). Within the conversion platform layer, the data and commands transformed to conform with the messaging requirements and communication protocol of the different service providers. The conversion process is transparent to the user and permits instant messaging to recipients regardless of the recipient's service provider. Incoming messages received from a recipient are received by the conversion platform layer and converted from the messaging requirements and communication protocol of the recipient's service provider to the common data structure of the user interface. The system also permits a user to establish and display a contact list even though the individuals in the contact list may be subscribers to different service providers. When the user logs on to the various service providers, the contact list data for each service provider is provided to the user interface and converted for display to the user.

43 Claims, 6 Drawing Sheets

SYSTEM AND METHOD FOR MULTI-PROTOCOL COMMUNICATION IN A COMPUTER NETWORK

TECHNICAL FIELD

The present invention is related generally to computer networks and, more particularly, to a system and method for multi-protocol communication in a computer network.

BACKGROUND OF THE INVENTION

Computer networks, such is the Internet, are extensively used for storage and retrieval of a vast reservoir of information. Person to person communication, in the form of electronic mail (e-mail), has also become widely accepted as replacement for conventional mail and facsimile. Any individual who has access to the Internet can establish an e-mail account in communicate with other individuals on the Internet.

With older forms of communication, such as telephones, a user need only know the telephone number they wish to call. A caller may have a particular local service provider and a different long distance carrier, while the callee may have a different long distance carrier and local service provider than the caller. However, the local service providers and long distance carriers of the caller and callee are irrelevant because the telephone system uses a standard communication protocol.

Similarly, e-mail communication uses a standard communication protocol that allows the transmission of messages between users that may have different service providers. A message sender can subscribe to or obtain an account with a first service provider and still send an e-mail message to a recipient even when the recipient subscribes to a second service provider. This is true even when each service provider may have a unique communication protocol to communicate with its own subscribers because the communication between subscribers utilizes a standard communication protocol. The communication is handled by the services themselves. That is, subscriber A tells service provider 1 to send a message subscriber B on service provider 2, and service provider 1 uses a protocol common to service providers 1 and 2 to relay the message from subscriber A to subscriber B via service 2.

A new form of e-mail communication, known as instant messaging, is gaining popularity among users of the Internet. As shown in a recent popular movie, "You've Got Mail," two individuals can engage in an ongoing electronic communication without the need for entering the message recipient's e-mail address for each individual transmission. The advantage of instant messaging is that two or more individuals may engage in an ongoing electronic "chat" by simply typing a message on the keyboard and pressing the "Enter" button on the computer keyboard or by clicking on a "Send" icon to the computer display screen. Another popular feature that some Internet service providers offer is presence data that allows a user to monitor another subscriber's activity or presence on the Internet. As those skilled in the art can appreciate, the term "presence" refers to an individual being logged onto a particular service.

Unfortunately, service providers do not utilize a standard communication protocol for instant messaging or activity data. As a result, a particular service provider only supports instant messaging and activity data between its own subscribers. If a user wishes to send an instant message to a particular individual that subscribes to a second service provider, the user must also subscribe to the second service provider and logon to the second service provider system to engage in instant messaging session with the particular individual. At the very least, this is a cumbersome procedure. In addition, even if an individual subscribes to two different service providers, he cannot engage in an instant messaging session with participants who are subscribers to the different service providers.

Therefore, it can be appreciated that there is a significant need for a communication system that will allow individuals to engage in an instant messaging session even if the individuals are subscribers to different service providers. The present invention provides this, and other advantages, as will be apparent from the following detailed description and accompanying figures.

SUMMARY OF THE INVENTION

A system and method for multi-protocol messaging communication on a computer network includes a user interface that allows the entry of data messages and/or commands and a conversion platform that translates the messages and/or commands to the unique messaging format and protocol supported by one or more service providers.

The invention is particularly useful for instant messaging on a computer network, such as the Internet, where a variety of service providers support instant messaging in a unique format and protocol applicable only to that service provider. The present invention provides a conversion platform that converts from a standard communication protocol used by the user interface to the messaging format and protocol used by each of the service providers.

In one embodiment, the user interface is coupled to the conversion platform by an application programming interface (API). The API provides a set of methods and functions to support commands that are recognized by one or more of the service providers. The API allows independent development of an application software program that can effectively communicate with the various service providers by using program calls using the standardized data structure of the API.

The function calls to the API are access the conversion platform and are routed to a services protocol module for each of the service providers. The services protocol module converts from the unified functionality of the API to the unique messaging format and protocol of its respective service provider. Certain commands that are supported by only selected service providers will be routed only to the service protocol modules that support the particular command. Following conversion of the API command to the unique messaging format and protocol of the service provider(s), the converted message is transmitted to each service provider.

Data, such as messages and/or commands, received from the service providers are processed in a reverse fashion with the respective services protocol module converting the message and/or command to a standardized format utilized by the API. The API provides the data and/or command to the application software program using the standardized data structures defined by the API.

The system also supports multi-protocol real-time presence of contacts on the computer network. A query message regarding user status may be sent to one or more of the service providers via the API and conversion platform. Responses received from the service providers are processed by the conversion platform in the API and provided to the application software program. Similarly, when a user logs on to a computer network, the user's presence may be reported to others via a function call to the API and the conversion platform to report the user's presence to the service provider.

DETAILED DESCRIPTION OF THE INVENTION

Figure 1:
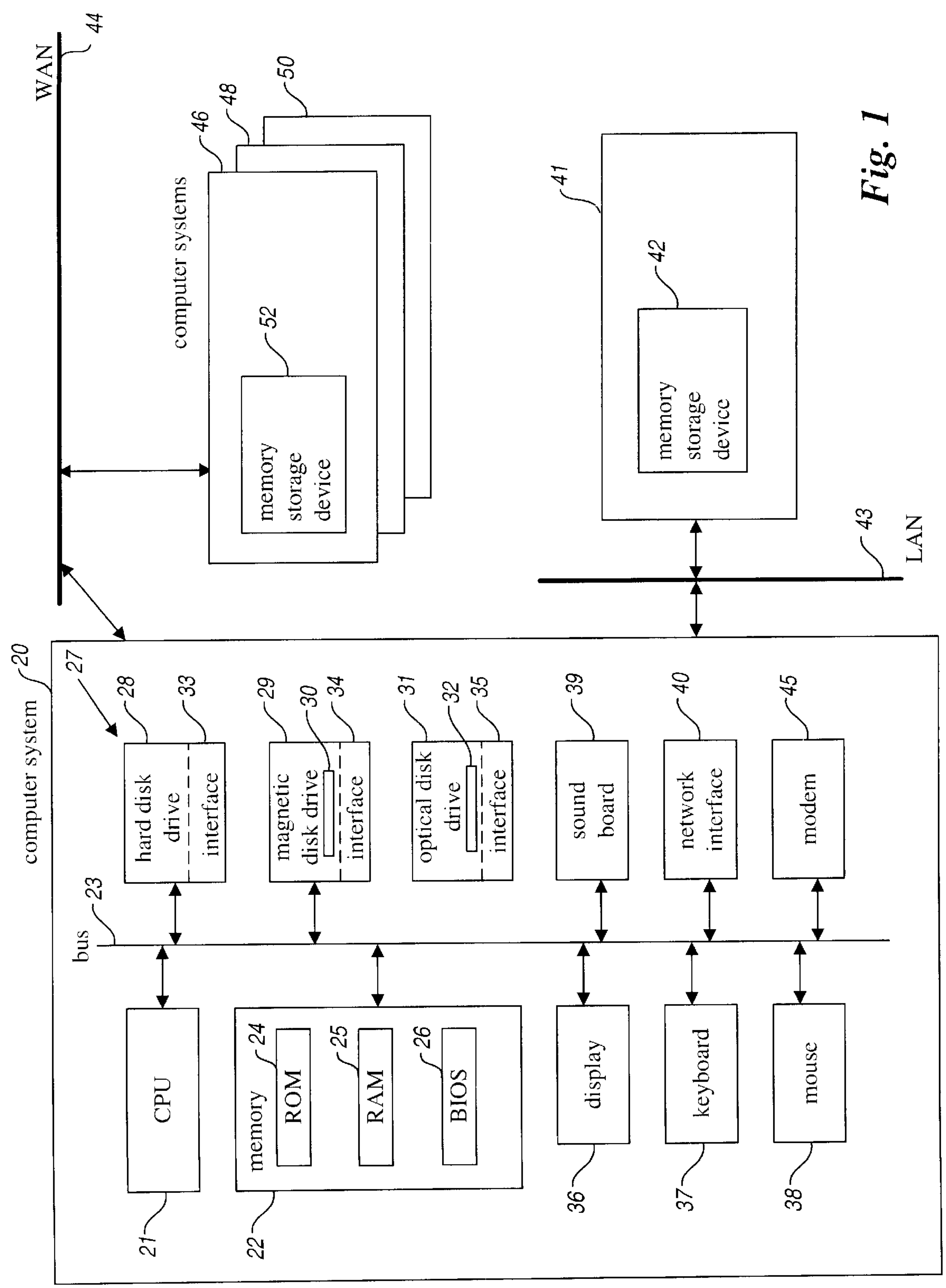
FIG. 1 illustrates a computer system that includes components to implement the system of the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a central processing unit (CPU) 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output system (BIOS) 26, containing the basic routines that helps to transfer information between elements within the personal computer 20, such as during start-up, may be stored in the ROM 24.

The personal computer 20 further includes input/output (I/O) devices 27, such as a hard disk drive 28 for reading from and writing to a hard disk, not shown, a magnetic disk drive 29 for reading from or writing to a removable magnetic disk 30, and an optical disk drive 31 for reading from or writing to a removable optical disk 32 such as a CD ROM or other optical media. The hard disk drive 28, magnetic disk drive 29, and optical disk drive 31 are connected to the system bus 23 by a hard disk drive interface 33, a magnetic disk drive interface 34, and an optical drive interface 35, respectively. The drives and their associated computer-readable media provide nonvolatile storage of computer readable instructions, data structures, program modules and other data for the personal computer 20. Although the exemplary environment described herein employs a hard disk, a removable magnetic disk 30 and a removable optical disk 32, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

Other I/O devices 27, such as a display 36, keyboard 37, mouse 38, sound board 39, may be included in the personal computer 20 and operate in a known manner. Still other I/O devices 27, such as a joystick, speakers and the like may also be included in the personal computer 20. For the sake of brevity, these components are not illustrated in FIG. 1.

The personal computer 20 may also include a network interface 39 to permit operation in a networked environment using logical connections to one or more remote computers, such as a remote computer 41. The remote computer 41 may be another personal computer, a server, a router, a network PC, a peer device or other common network node, and typically includes many or all of the elements described above relative to the personal computer 20, although only a memory storage device 42 has been illustrated in FIG. 1. The logical connections depicted in FIG. 1 include a local area network (LAN) 43 and a wide area network (WAN) 44. Such networking environments are commonplace in offices, enterprise-wide computer networks, intranets and the Internet.

When used in a LAN networking environment, the personal computer 20 is connected to the LAN 43 through the network interface 40. When used in a WAN networking environment, the personal computer 20 typically includes a modem 45 or other means for establishing communications over the WAN 44, such as the Internet. The modem 45, which may be internal or external, permits communication with remote computers 46–50. In a networked environment, program modules depicted relative to the personal computer 20, or portions thereof, may be stored in the remote memory storage device 42 via the LAN 51 or stored in a remote memory storage device 52 via the WAN 44. It will be appreciated that the network connections shown are exemplary and other means of establishing a communications link between the computers may be used. For example, the computer system 20 may be coupled to the WAN 44 via the network interface 40 instead of the modem 45.

Figure 2:
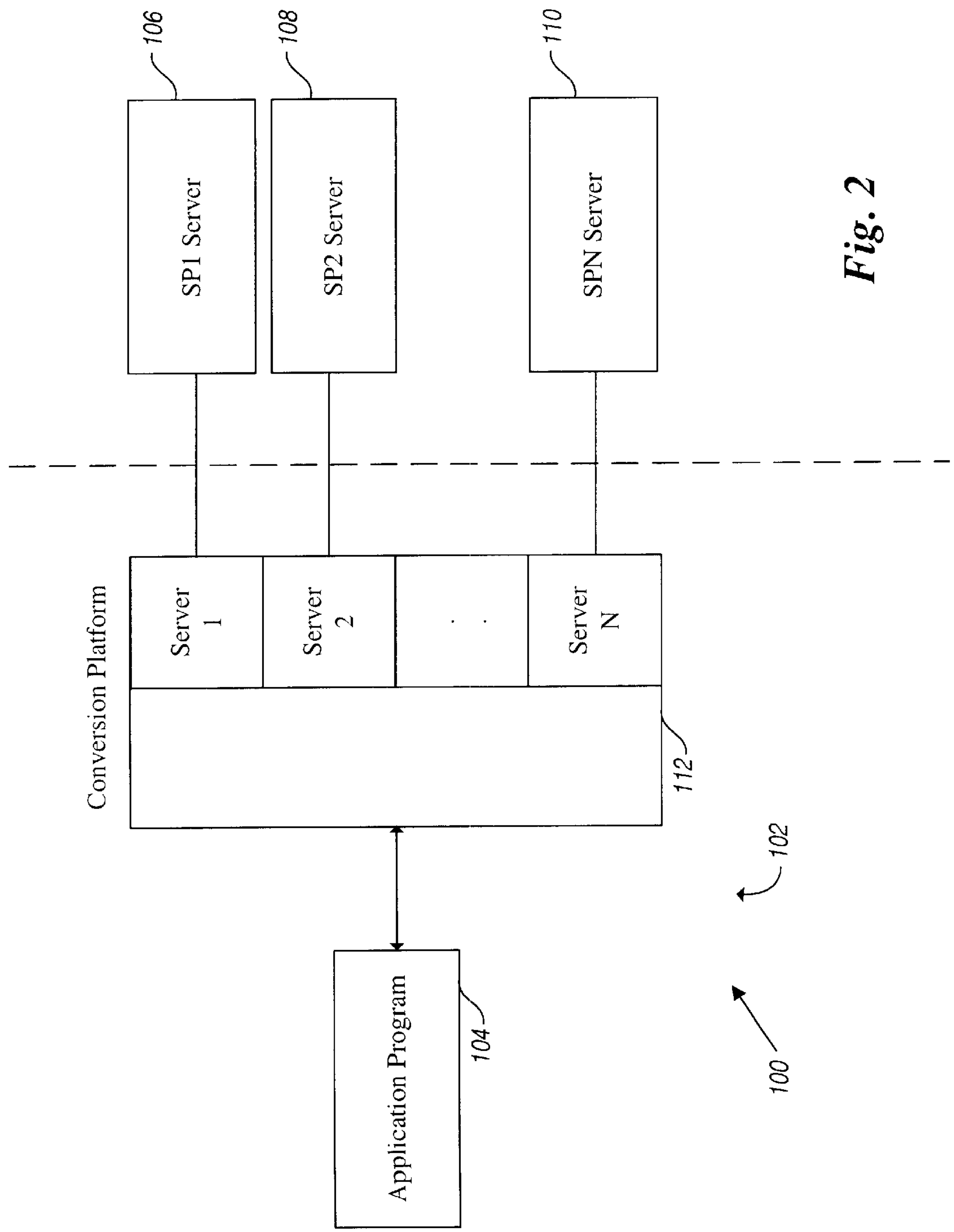
FIG. 2 is a functional block diagram of a client application program coupled to the servers of multiple service providers.

The present invention provides a universal client application and an underlying conversion platform that allows the client application to communicate with the servers of multiple service providers. Rather than require all service providers to utilize a uniform instant messaging format and protocol, the present invention provides a conversion platform that accommodates the unique format and protocol of different service providers. Although the examples presented herein refer to the Internet, those skilled in the art will recognize that the principles of the present invention are applicable to computer networks in general and are not limited to the Internet. The present invention is embodied in a system 100 illustrated in the functional block diagram of FIG. 2. The block diagram of FIG. 2 is described in terms of a client-server architecture. A client 102 executes an application program 104 that provides user interface support and allows the user to enter data and other commands using, by way of example, the keyboard 37 (see FIG. 1). The application program 104 executing on the client 102 also allows the display of data received from other participants in an instant messaging session. The received data may be shown on the display 36. In addition, the application program 104 executing on the client 102 can indicate the presence of individuals on a computer network, such as the Internet, using the display 36 even when individuals may be subscribers to different service providers. This aspect of the invention will be described in greater detail below.

The system 100 can operate with a number of different service providers, each of which has its own proprietary server. The term service provider is intended to include entities that provide instant messaging services and may provide other services as well, such as content providers, e-mail providers, and the like. FIG. 2 illustrates the operation of the system 100 with N service providers and includes a server 106 for a service provider SP1, a server 108 for a service provider SP2, and a server 110 for a service provider SPN. Usiny conventional technology, individuals who subscribe to the service provider SP1 can send e-mail to any other individual whether or not they subscribe to the service provider SP1 (assuming the service providers support e-mail). However, an individual that subscribes to the service provider SP1 can engage in instant messaging sessions only with other subscribers to the same service provider (i.e., the service provider SP1). To overcome this shortcoming, the system 100 includes a conversion platform 112 that communicates with the client 102 using a standardized set of command data structures and the individual servers 106–110 using the appropriate communication protocol or functionality for the particular server. The term "protocol" is used herein to generally describe the steps or procedures that must be taken to implement one or more functions by the application program 104 or any of the service providers SP1–SPN. The operation of the conversion platform 112 will be described in greater detail below.

In addition to providing a conversion between the protocol or functionality used by the client 102 and the unique protocol or functionality used by the individual servers 106–110, the system 100 allows the client 102 to display the presence of the individuals on the Internet even when individuals are subscribers to the different service providers. Typically, the user enters the names of individuals into a contact list, or user affiliation list, and the service provider provides status data (e.g., presence data) to indicate to the user whether individuals in the contact list are present on the Internet.

The system 100 utilizes contact lists for each service provider and translates the contact lists to a standard display format to permit the client 102 to display a single contact list on the display 36 (see FIG. 1). Some service providers describe their contact lists as a "buddy list." However, other service providers may use different terminology. For purposes of the present description, the term "contact list" refers to any data structure in which a user may enter identification data for one or more individuals (i.e., contacts) with whom the user communicates on a regular basis and/or whose presence on the Internet the user may wish to monitor. The identification data is typically in the form of an e-mail address or a unique user name or nickname that has been selected by the individuals.

The system 100 utilizes the contact list storage techniques implemented by each service provider rather than creating and storing a universal contact list. This is illustrated in the functional block diagram of FIG. 3 where additional details are also provided for the client 102 and the conversion platform 112. The client 102 includes a user interface (UI) 116 that allows the user to enter data via the keyboard 37 (see FIG. 1) or other input device, and allows the display of messages on the display 36. For example, the UI 116 may be part of an instant messaging software program provided by a service provider or part of an e-mail software program. The UI 116 provides an interface for the display 36 and the keyboard 37. The display 36 displays received instant messages as well as a list of individuals from the contact list that are active on the Internet. In an exemplary embodiment, the system 100 will aggregate the lists from the different service providers and return a combined list of all contacts to show on the display 36.

Figure 3:
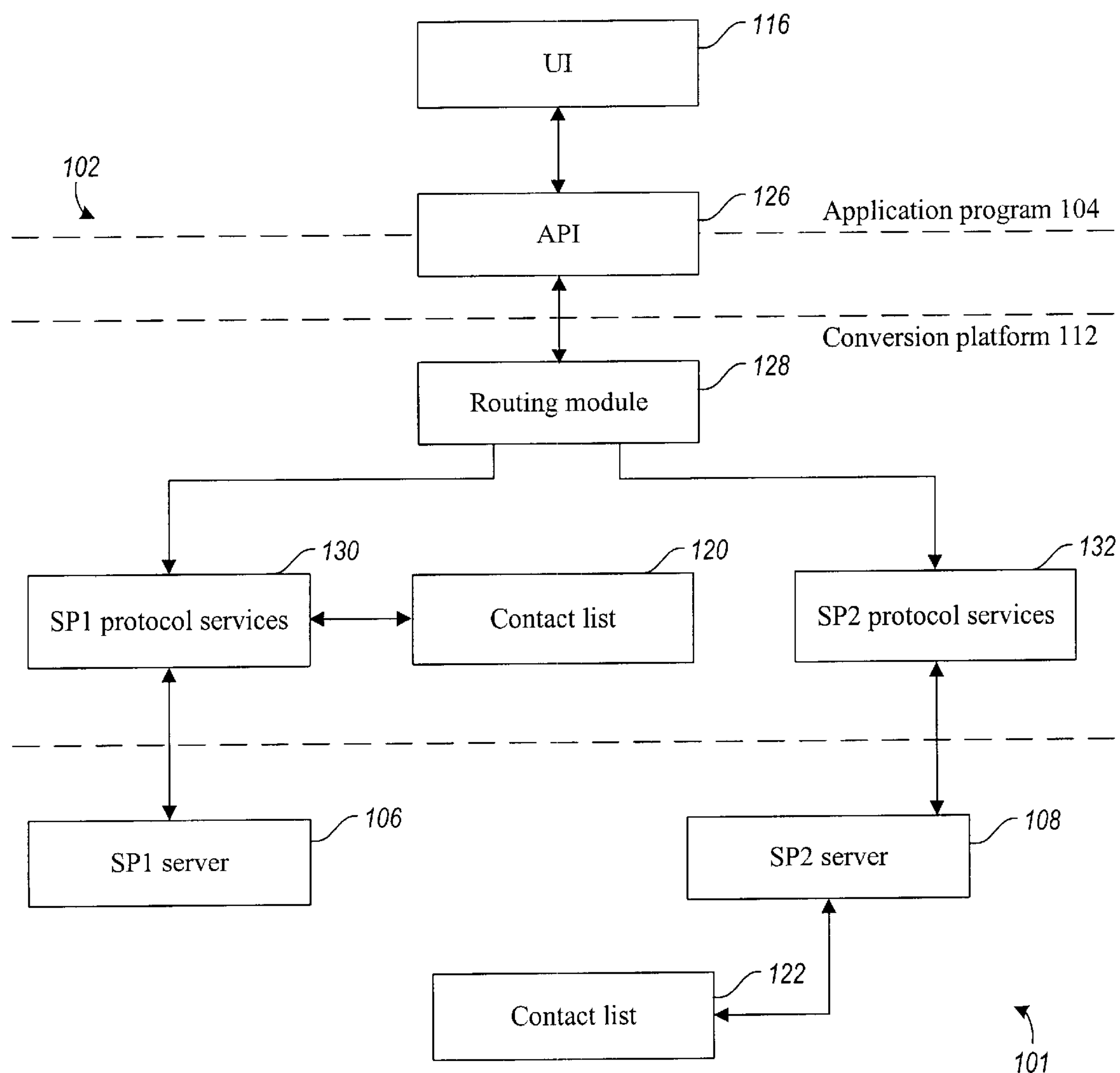
FIG. 3 is a functional block diagram illustrating the conversion between a common client application format and multiple formats of different service providers.

In the example illustrated in FIG. 3, the service provider SP1 has a contact list 120 that is stored locally on the user computer. In contrast, the service provider SP2 has a contact list 122 data stored in association with the server 108. The UI 116 will extract the affiliation data (i.e., contact data) from the local contact list 120 and request the affiliation data from the server 108. The UI 116 combines the affiliation data from the two lists and displays it on the display 36. It should be noted that the local contact list 120 and the server-based contact list 122 are intended to illustrate possible storage techniques for contact lists. Each service provider may have a locally stored contact list, a server-based contact list, or a combination of the two. Other forms of contact list storage may also be used. The present invention is not limited by the location or form of the contact list.

Figure 4A:
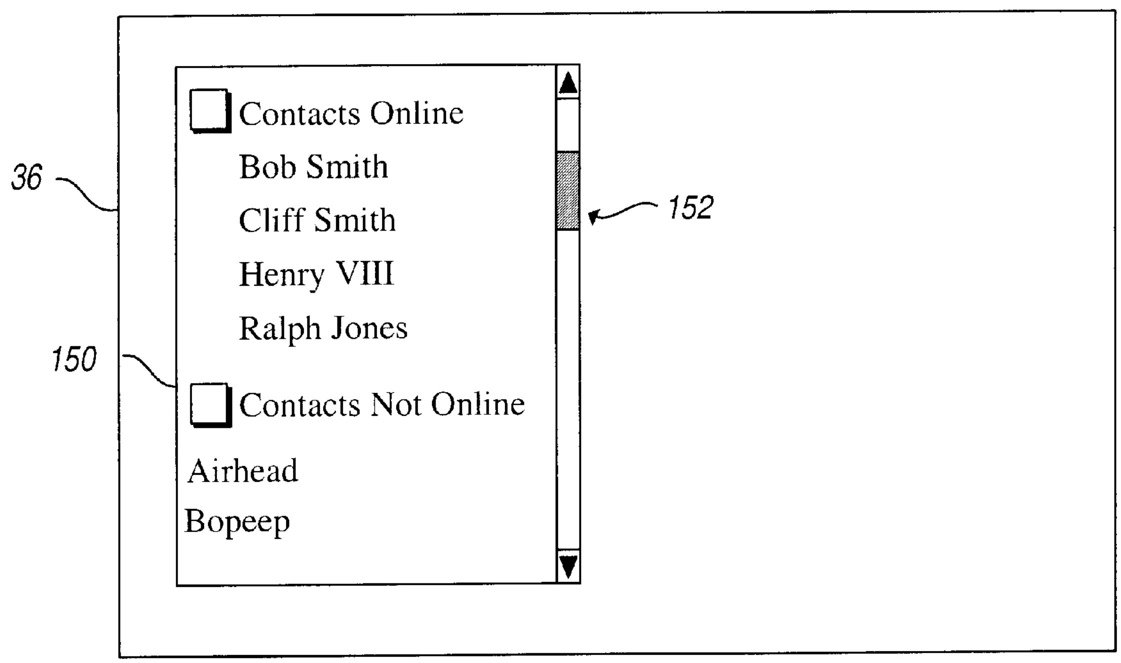
FIGS. 4A and 4B illustrate the display of contact lists by the system of the present invention.
Figure 4B:
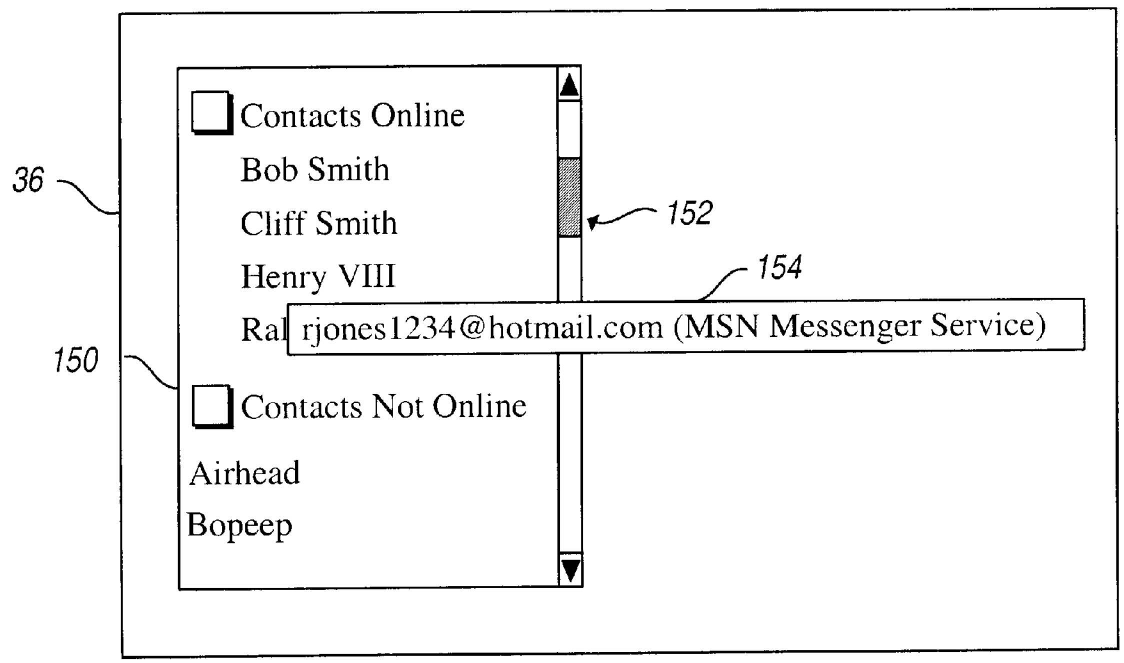

The system 100 advantageously utilizes the contact list storage capabilities of each service provider and reformats the data to a common form for the display 36. This is illustrated in FIGS. 4A and 4B where the display 36 displays a contact list 150. In a typical embodiment, the contact list 150 may include typical navigational tools 152, such as a scrollbar and scroll arrows. The contact list 150 provides no indication of the service provider associated with any of the names (i.e., contacts) contained therein. However, the user can manipulate a cursor (not shown) over a selected contact on the contact list 150 to display additional information, as illustrated in FIG. 4B. FIG. 4B contains a "floating" data window 154 to provide additional information regarding the selected contact.

Returning again to FIG. 3, the UI 116 also provides a common format for input data, such as instant messaging data entered by the user via the keypad 37 (see FIG. 1). The data (e.g., the message data) and other user commands are passed to the conversion platform 112 via an application program interface (API) 126. The API 126 provides an abstraction layer so that the application program 104 (see FIG. 2) and UI 116 can be developed and operated independently of specific format and protocol required by individual service providers. As those skilled in the art can appreciate, the function of the API 126 is to provide a standardized set of data structures that allow programmers to develop software independently of the underlying implementation of the API. FIG. 3 illustrates the API 126 at the boundary between the application program 104 and the conversion platform 112 because the API serves as the interface between the two. The software programs, such as the application program 104 (see FIG. 2), interface with the other components of the system 100 by implementing calls to the API 126 using the data structures defined by the API. The API 126 performs this function by defining a set of functions that operate across one or more service providers.

The conversion platform 112 includes a routing module 128 that interfaces with the API 126 and further interfaces with protocol services modules for each service provider.

The routing module 128 is primarily responsible for routing data between the API 126 and the protocol services modules for the specific service providers. As will be described in greater detail below, service providers do not all support a common set of features or functions. The routing module 128 will route commands from the API 126 only to the protocol services modules for those service providers that support the particular command(s). The routing module 128 also routes data from the protocol services modules to the API 126. The protocol services module for each service provider translates outgoing messages from the common format provided by the API 126 to the unique format and protocol used by the respective service provider. The protocol services modules also translate incoming messages received from the service providers, in each respective service provider's unique format and protocol, to the common format used by the API 126.

FIG. 2 illustrates service providers SP1–SPN to illustrate that the system 100 can operate with any number of service providers. For the sake of brevity, FIG. 3 illustrates the operation of the system 100 with two different service providers SP1 and SP2. However, the principles of the invention may be extended to any number of service providers. The conversion platform 112 includes an SPI protocol services module 130 and SP2 protocol services module 132, which interconverts between the common format used by the API 126 and the unique protocol required by the service providers SP1 and SP2, respectively.

For example, one of the features that instant messaging supports is changing the user's state from "online" to "busy" (i.e., away from computer). When this function is selected by the UI 116, the software program 104 makes a call to the API 126. In the example above, the user can change to the "busy" state using the following API command:

put_LocalState(BUSY)

to define the user's local state as busy. This indicates to the service providers that the user wishes to be placed in the "busy" state. The protocol services modules convert the API command "put_LocalState(BUSY)" to the specific format and protocol required by the service provider. For example, "HOTMAIL" (a trademark of Microsoft Corporation), which includes an instant messaging service, uses the following protocol command to change to the busy state:

CHG BSY to change the user's state in "HOTMAIL" to busy. The protocol services module associated with "HOTMAIL" will convert the API command "put_LocalState(BUSY)" to "CHG BSY" and transmit that command to the "HOTMAIL" server. As those skilled in the art can appreciate, other service providers may have completely different ways of implementing this change of state. In each case, the API command put_LocalState(BUSY) will cause each implementation of the protocol services module to transmit a command in the appropriate format and protocol for its respective service provider to change the user's state to "busy." The specific data structure used for the API 126 for the "LocalState" command and other commands or messages is within the scope of knowledge of a computer programmer and need not be discussed herein. For example, the converted command (e.g., CHG BSY) may be accompanied by an identifier code (i.e., a transaction identification) to allow the system 100 to easily identify a response from a service provider if the response includes the transaction identification.

To understand operation of the system 100, assume the user is typing a message on the keyboard 37 (see FIG. 1) to be transmitted to a recipient who, in the present example, is a subscriber to the service provider SP1. The user types a message in a conventional fashion using the keyboard 37 or other input device, such as a microphone (not shown) coupled to the sound board 39. When the user transmits the message, the API 126 transfers the message to the conversion platform 112. In the example presented herein, the routing module 128 of the conversion platform 112 routes the outgoing message to the SP1 protocol services module 130. The SPI protocol services module 130 converts the outgoing message to the appropriate format and adds any other protocol requirements, such as headers, recipient identification data, and the like. For example, the recipient identification data may be in a first format for use with the UI 116, and must be converted to the format that is compatible with the service provider SP1. Following conversion of the message to the appropriate format, the SP1 protocol services module 130 transmits the message to the SP1 server 106.

Messages received from the SP1 server 106 undergo the reverse process. That is, a message intended for the user of the client 102 is transmitted from the SP1 server 106 to the client and received by the SP1 protocol services module 130. The SP1 services protocol module 130 converts the received message to a format and protocol compatible with the client 102 and the API 126. The converted message is routed through the common component 128 to the API 126 and on to the UI 116.

A similar process occurs for outgoing and incoming messages between the UI 116 and the service provider SP2. However, the communications between the UI 116 and the SP2 server 108 are routed through the SP2 protocol services module 132 for proper interconversion between the format and message protocol required by the service provider SP2 and that used by the UI 116. Still other messages, such as the "busy" status message described above, are routed by the routing module 128 to protocol services modules (e.g., the SP1 protocol services module 130 and the SP2 protocol services module 132) for all services providers.

One advantage of the system 100 is that instant messaging among multiple service providers is transparent to the user. That is, the user of the system 100 can perform instant messaging among multiple service providers. The example above discussed transmission of instant messages between the UI 116 and either the service provider SP1 or the service provider SP2. However, it is common to have instant messaging sessions with three or more individuals. The principles of the present invention are equally applicable to instant messaging to multiple users even that when the multiple users are subscribers to different service providers. Using the example of FIG. 3, it is possible for the client 102 to send instant messages from the UI 116 to recipients that subscribe to different service providers, such as the service provider SP1 and the service provider SP2.

As can be appreciated by those skilled in the art, certain basic features must be provided by any service provider for the satisfactory operation of an instant messaging system. For example, all service providers must support the ability to send instant messages between at least two individuals. Other features, such as the ability to establish a contact list and to add and remove individuals from the contact list, are also universal among service providers. Other features supported by most or all service providers include the ability to send and receive instant messages from any contacts that subscribe to the particular service provider, the ability to receive state or status updates on those contacts (e.g., "busy" or "online") and the ability to prevent one or more people on the service from obtaining your online status or to transmit instant messages to you by "blocking" selected individuals. However, different service providers may not provide support for other features or capabilities. For example, some service providers support instant messaging between three or more individuals while other service providers are only capable of instant messaging between two individuals.

The features that are supported by service providers are reflected in a capabilities list provided by each service provider. To enhance the communication with multiple service providers, the system 100 can obtain a list of capabilities of each service provider of using a capability query message. An example capability list is provided below:

APP_INVITE
MULTI_POINT
ROAM
- where the example list for this service provider allows the use of application invitations as well as for multipoint communication. "Multipoint" communication refers to the ability to support instant messaging between three or more individuals. Some service providers may have the ability to invite a user to use a certain application or service over a network. This feature is sometimes referred to as an "APP invite". For example, a subscriber to the "MSN MESSENGER SERVICE" (a trademark of Microsoft Corporation) can invite an individual to use a feature called "NETMEETRNG" (a trademark of Microsoft Corporation) to allow a program to automatically set up a communication between individuals using the "NETMEETING" software function. Selected service providers allow contact lists to "roam" from one computer to another by storing lists on the server, such as the contact list 122 coupled to the SP2 server 108 in FIG. 3. With this feature, a user can logon to the server provider from any computer and retrieve their contact list. Other service providers that store the contact list locally (e.g., at the client level), such as the contact list 120 in FIG. 3, do not have "roam" capabilities. With the capabilities list, the system 100 can avoid sending a request for a feature that is not supported by a particular service provider.

As previously discussed, a common feature for all service providers is the ability to add additional individuals to the contact list. For example, some service providers allow a "people search" to locate individuals that are subscribers of that particular service provider. If the user already knows the service provider for a particular individual, the user may manually select the service provider in response to a query shown on the display 36 (see FIG. 1). As those skilled in the art can appreciate, this process is similar to the manual entry of a user's e-mail address in conventional e-mail communication systems. In response to the manual selection of the service provider, the system 100 can forward a "people search" message to the selected service provider using the proper format and communication protocol for the selected service provider.

If the user is unaware of the identity of the service provider for a particular individual, the system 100 will convert the "people search" message to the proper format and communication protocol for each service provider and forward the people search message to each service provider. The results of the various searches may be combined and shown on the display 36. In some cases, the service provider will report back a message indicating that no user was found that matched the specified criteria. However, assuming that the particular individual is a subscriber to one of the service providers coupled to the system 100, that service provider will report back positive results for the search. The user can simply add that name to the contact list for future use.

The process of reporting a user's current status (i.e., presence) is known in the art and will be described only briefly herein with respect to the conversion between the UI 116 and the protocol services modules (e.g., the SP1 protocol services module 130). Presence is generally detected based on the logon status of an individual. An individual is "present" if he is logged on to, by way of example, an instant messaging service provider (e.g., one of the service providers SP1–SPN of FIG. 2). When a user of the system 100 first logs on to the Internet and to the various service providers, the user's contact lists from the various service providers will be processed by the UI 116 and shown on the display 36 (see FIGS. 4A and 4B). In addition, the UI 116 may send a status message to each individual on the contact list indicating the current status of the user on the Internet. Furthermore, the UI 116 may send a request for the current status of other individuals on the users contact list. That is, the UI 116 causes a status query message to be sent to each of the service providers SP1–SPN requesting the current status for those individuals that are subscribers to each respective service provider.

The presence data is useful in situations other than instant messaging. For example, e-mail message notification may also utilize the presence data. Other forms of notification such as, by way of example, notification of selected stock prices, can be transmitted when a system determines that the user who requested the notification is now active (i.e., present) on the Internet. The system 100 advantageously allows such presence data to be communicated across the artificial boundaries imposed by service providers.

Although service providers typically require a paid subscription to access its data content, most provide instant messaging capability without a paid subscription. However, a user must still register and establish an account with a service provider in order to access to the instant messaging features. In accordance with the principles of the present invention, the user has a designated primary service provider and one or more secondary service providers. The user initially logs onto the primary service provider with a user name and password thus allowing a defined "user state" during operation of the system 100. If the logon operation with the primary service provider is successful, the system permits logon procedures to continue with the secondary service provider(s).

Figure 5A:
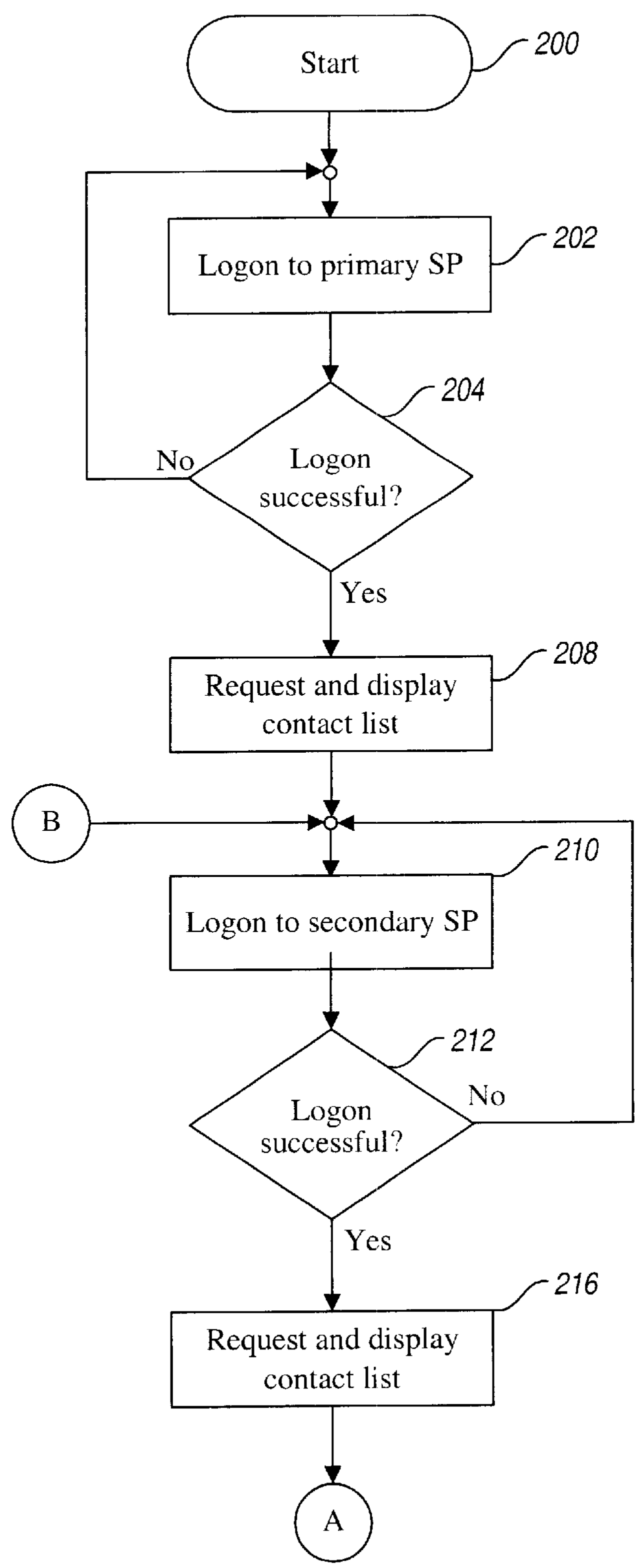
FIGS. 5A and 5B together form a flowchart illustrating the logon operation of the system of the present invention.
Figure 5B:
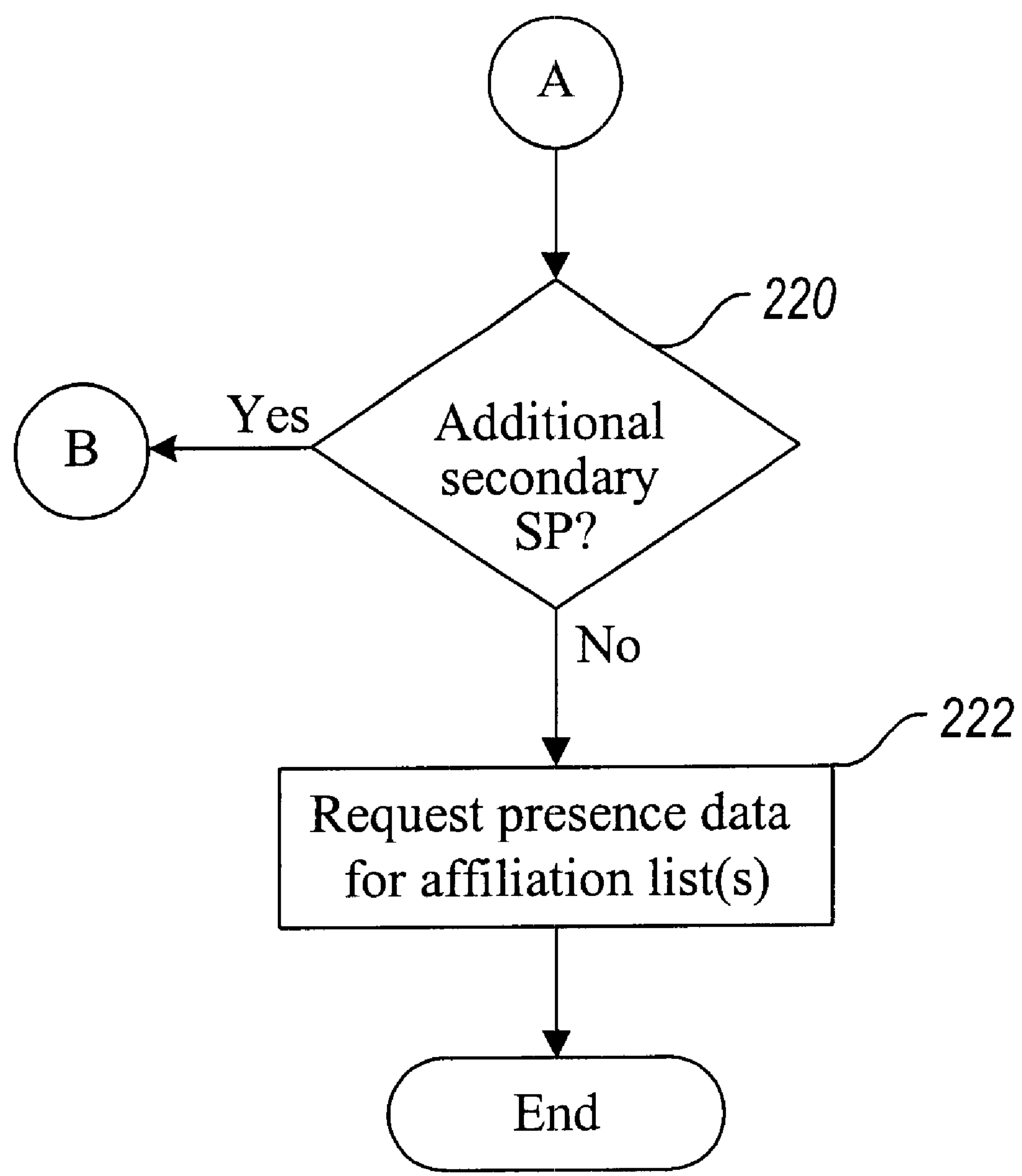

The logon process is illustrated in the flowchart of FIGS. 5A and 5B. At a start 200, it is assumed that the user has already established the necessary accounts with the primary service provider and one or more secondary service providers. In step 202, the system logs onto the primary service provider using the logon procedures established by that service provider. Typically the logon process and requires entry of the user's name and password. In decision 204, the system determines whether the logon process was successful. If the logon process was not successful, the result of decision 204 is NO and the system returns to step 202 in an attempt to logon to the primary service provider.

If the logon process was successful, the result of decision 204 is YES and, in step 208, the system 100 requests and displays the contact list for the primary service provider. In step 210, the system 100 logs onto a secondary service provider using the logon procedures established by that secondary service provider. This typically includes entry of the user name and password for the particular secondary service provider. In decision 212, the system 100 determines whether the logon process was successful. If the logon process was not successful, the result of decision 212 is NO and the system 100 returns to step 210 in an attempt to logon to the secondary service provider.

If the logon process was successful, the result of decision 212 is YES and, in step 216, the system 100 requests and displays the contact list for the secondary service provider. In one embodiment, the display 36 (see FIGS. 4A and 4B) displays the single contact list 150 that combines the individuals or contacts that are present in the contact list from the primary service provider and the contact list from the secondary service provider. The system 100 may also display data indicating additional data (e.g., the service provider) associated with each individual on the combined contact list continuously or only when selected by the user, as illustrated in FIG. 4B. Alternatively, the system 100 may maintain separate contact list associated with the primary service provider and the secondary service providers, respectively.

Following the display of the contact list in step 216, the system 100 moves to decision 220, shown in FIG. 5B, to determine whether there are additional secondary service providers. If there are additional secondary service providers, the result of decision 220 is YES in the system returns to steps 210–216 in FIG. 5A to logon to the additional secondary service provider and to request in display the contact list for that additional secondary service provider. If there are no additional secondary service providers, the result of decision 220 is NO. In step 222, the system 100 requests presence data (i.e., the current status data) for the individuals on the contact list(s). The flowchart of FIGS. 5A–5B illustrate the logon procedures for multiple secondary service providers. Those skilled in the art will recognize that the steps illustrated in FIGS. 5A–5B must be completed for a successful logon to the secondary service providers, but that the steps need not be completed in the precise order. For example, the system 100 can transmit logon requests for all secondary service providers at one time and complete the logon process for whichever secondary service provider is the first to respond to the logon request. This process may allow faster and more efficient completion of the logon process.

The presence data may be retrieved in steps 208, 216 and 222 in a manner similar to the process described above with respect to instant messaging itself. That is, the system 100 sends a query message to each service provider to requests presence data for the individuals on the contact list that are associated with the respective service provider. The query message may be constructed by the UI 116 (see FIG. 3) and passed to the conversion platform 112 by the API 126. The query message is converted to the appropriate format and protocol for each service provider and transmitted to the appropriate service provider server. The presence data is provided by each service provider server and relayed to the UI 116 via the conversion platform 112 and the API 126. Those skilled in the art will recognize that many service providers automatically retrieve the contact list when the user logs on to the service. Thus, the request for the contact list in steps 208, 216, and 222 is performed automatically by the service provider and does not require the generation and transmission of any query message(s).

The presence data is shown on the display 36 (see FIG. 1). For example, the contact list 150 (see FIGS. 4A and 4B) may simply be divided into two portions with a first portion indicating the contacts that are currently online and the second portion indicating the contacts that are not online. Alternatively, the system 100 can use highlighted or bold text to indicate the names of individuals who are present on the Internet while those individuals who are not present on the Internet are indicated with regular text. Those skilled in the art can appreciate that other forms of graphic indicators may be used to show presence on the Internet. Thus, the display 36 (see FIG. 1) shows a contact list with a plurality of individuals that are customers of different service providers.

The advantage of a combined contact list is that the user can engage in an instant messaging session without regard to the service provider associated with any individual. The system 100 also allows the conversion of the user name or alias from one service provider to another. For example, an individual may have different e-mail aliases for different service providers. The contact list need not display the same individual under each of the different e-mail aliases. Instead, the contact list may contain the individuals name under the user name or e-mail alias of the users primary service provider. The system 100 will convert the user name for display on another system whereby the user may have one name (e.g., Henry Smith) on one service provider with the same individual having an e-mail alias (e.g., Henry VIII) on another service provider.

The process illustrated in the flowchart of FIGS. 5A and 5B provides one example of a logon procedure. However, those skilled in the art will recognize that other logon procedures may be used satisfactorily by the system 100. For example, the system 100 can complete the logon process for the primary service provider and each of the secondary service providers before requesting the contact lists from any service provider. Alternatively, the system may also request presence data along with the contact list as the logon process is completed for each service provider. Thus, the system 100 is not limited by a specific logon sequence or sequence in which data is requested from any of the service providers. Furthermore, those skilled in the art will appreciate that an automatic logon process may be initiated by the system 100 wherein the user may initiate the entire process illustrated in the flowchart of FIGS. 5A and 5B simply by logging on to the primary service provider. Various account numbers and passwords may be conveniently stored within the computer system 20 (see FIG. 1) to eliminate the tedium of manual entry of each user account name and password.

The logoff procedure follows a similar process to that illustrated in the flowchart of FIGS. 5A and 5B, and is within the base of knowledge of one skilled in the art. Accordingly, this process need not be described herein. As previously discussed, the system 100 designates one service provider as the "primary" service provider while one or more additional service providers are designated as "secondary" service providers. Although this designation is not essential, it is convenient for operation of the system 100 because it allows the user to initially logon to the primary service provider and therefore maintain a known operational state. If there were no designation as a primary service provider, it is possible for the system to enter an unknown user state if the system were communicating with a secondary service provider and unexpectedly became disconnected from that service provider. This may be avoided by designating one of the service providers as the primary service provider such that the system 100 is always in a known state based on connection with the primary service provider.

In one embodiment, the system must initially be connected to the primary service provider and can subsequently logon to one or more secondary service providers. If the logon process for the primary service provider is not completed satisfactorily, the process will not continue since the system 100 may subsequently be in an unknown state. However, if the logon process with the primary service provider was successful, the logon process with the secondary service providers can proceed. If the logon process for one secondary service provider is unsuccessful, the system 100 may still operate satisfactorily with the primary service provider and those secondary service providers for which the logon process was successful.

During communication with the primary service provider and secondary service provider(s), it is possible that communication may be terminated unexpectedly, such as a failure of a server or other component of a service provider. If a communication link with a secondary service provider is terminated, the system 100 will continue operation with the primary service provider and any secondary service providers with which communication links are still established. The system may automatically attempt to reestablish contact with the secondary service provider using a portion of the steps illustrated in the flowchart of FIGS. 5A and 5B. Thus, continuous communication with the secondary service providers is not essential for satisfactory operation of the system 100.

In the event that communication between the user and the primary service provider is terminated, the system may be in an unknown operational state. Accordingly, the system 100 will automatically disconnect from the secondary service providers if the connection to the primary service provider is terminated. The system may subsequently attempt to reconnect to the primary service provider using the process outlined in the flowchart of FIGS. 5A and 5B. If the reconnection to the primary service provider is successful, the system 100 may subsequently reconnect to the secondary service providers. In this manner, the system 100 is always in a known operational state based on the connection with the primary service provider.

Thus, the system 100 provides a technique for seamless instant messaging between two or more individuals without the need for individuals to all subscribe to the same service provider. The system 100 can provide the appropriate data structures that would allow any application program (e.g., the application program 104 in FIG. 2) to effectively communicate with any service provider and can be further configured to support any functions or features supported by any service provider.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for multi-protocol messaging communication on a computer network, the system comprising:

a user interface module to permit user entry of data for an outgoing message to be transmitted on the computer network, the user interface module having a format compatible with an application software program;

first and second service providers having first and second communication protocols, respectively;

an application program interface coupled to the user interface module and communicating therewith, the application program interface defining a set of data structures to support data transfer, including the outgoing message, from the user interface to the first and second service providers; and a conversion platform coupled to the application program interface and to the first and second service providers, the conversion platform converting data defined by at least one of the data structures of the application program interface to the first and second communication protocols for communicating with the first and second service providers, respectively, the conversion platform converting the outgoing message received from the application program interface to the first and second communication protocols and transmitting the outgoing message using the first and second communication protocols to the first and second service providers, respectively.

2. The system of claim 1 wherein the computer network is the Internet and the first and second service providers are instant messaging service providers, the outgoing message being an instant message transmitted from the user interface to first and second message recipients who are subscribers to the first and second service providers, respectively, the conversion platform converting the instant message to the first and second communication protocols for instant messaging and transmitting the instant message to the first and second service providers, respectively.

3. The system of claim 1 wherein the conversion platform comprises a routing module and first and second protocol services modules, the routing module routing the outgoing message from the application program interface to the first and second protocol services modules for conversion to first and second communication protocols, respectively.

4. The system of claim 1 wherein the outgoing message is a command from the user interface to the first and second service providers.

5. The system of claim 1 wherein the outgoing message is a status inquiry from the user interface to the first and second service providers, to obtain status data for first and second individuals coupled to the computer network via the first and second service providers, respectively.

6. The system of claim 1 wherein the first and second service providers have first and second sets of operational capabilities, respectively, and the outgoing message is a command to request capabilities data related to the first and second sets of operational capabilities.

7. The system of claim 6 wherein the conversion platform comprises a routing module and first and second protocol services modules, the routing module routing a subsequent outgoing message from the application program interface to the first and second protocol services modules based on the capabilities data wherein the routing module routes the subsequent outgoing message to ones of the first and second protocol services modules for which the capabilities data indicates an operational capability to process the subsequent outgoing message and does not route the subsequent outgoing message to ones of the first and second protocol services modules for which the capabilities data indicates no operational capability to process the subsequent outgoing message.

8. The system of claim 1 wherein an incoming message is received via the computer network from a selected one of the first and second service providers, application program interface further defining a set of data structures to support data transfer, including the incoming message, from the selected one of the first and second service providers to the user interface, the conversion platform being further operable to convert the incoming message received from the selected one of the first and second service providers to data defined by at least one of the data structures of the application program interface.

9. The system of claim 8, further comprising a display wherein the user interface receives data related to the incoming message from the application program interface and displays the incoming message on the display.

10. The system of claim 1, further comprising a storage area to maintain a contact list containing identification data for a plurality of individuals and data related to their respective service providers.

11. The system of claim 10 wherein the outgoing message is designated for transmission to a first recipient coupled to the computer network via the first service provider, the conversion platform using the data related to service providers to convert the outgoing message to the first communication protocol and transmitting the outgoing message using the first communication protocol to the first designated recipient.

12. The system of claim 11 wherein the conversion platform comprises a routing module and first and second protocol services modules, the routing module using the data related to service providers to convert the outgoing message to the first protocol services module for conversion to first communication protocol.

13. The system of claim 1, further comprising first and second provider storage areas associated with the first and second service providers, respectively, to maintain first and second provider contact lists containing identification data for individuals that are subscribers to the first and second service providers, respectively.

14. The system of claim 13, further comprising a first server associated with the first service provider, the first provider storage area being maintained in association with the first server.

15. The system of claim 13 wherein the user interface module is executed on a local computer platform and the first provider storage area is maintained on the local computer platform.

16. The system of claim 13, further comprising a combined contact list storage area to store both the first and second provider contact lists as a combined contact list.

17. A computer-readable medium containing computer-executable instructions for performing multi-protocol messaging communication on a computer network comprising:

sensing user entry of data for an outgoing message to be transmitted on the computer network;

placing the entered data in a format compatible with an application software program;

establishing a communication link with first and second service providers having first and second communication protocols, respectively;

defining a set of application program interface data structures to support data transfer, including the outgoing message, from the user interface to the first and second service providers;

converting data defined by at least one of the set of data structures of the application program interface to at least one of the first and second communication protocols; and transmitting the outgoing message using the at least one of the first and second communication protocols to a corresponding one of the first and second service providers.

18. The computer-readable medium of claim 17 wherein the computer network is the Internet and the first and second service providers are instant messaging service providers, the outgoing message being an instant message transmitted from the user interface to at least one of first and second message recipients who are subscribers to the first and second service providers, respectively, by converting the instant message to the at least one of the first and second communication protocols for instant messaging and transmitting the instant message to the at least one of the first and second service providers.

19. The computer-readable medium of claim 17, further comprising computer-executable instructions for routing the outgoing message from the application program interface to at least one of first and second protocol services modules corresponding to the first and second service providers, respectively, and for converting the outgoing message within the at least one of the first and second protocol services modules to the at least one of the first and second communication protocols.

20. The computer-readable medium of claim 17 wherein the outgoing message is a command from the user interface to the first and second service providers.

21. The computer-readable medium of claim 17 wherein the first and second service providers have first and second sets of operational capabilities, respectively, and the outgoing message is a command to request capabilities data related to the first and second sets of operational capabilities.

22. The computer-readable medium of claim 21, further comprising computer-executable instructions for routing a subsequent outgoing message from the application program interface to the at least one of the first and second protocol services modules based on the capabilities data wherein the subsequent outgoing message is routed to ones of the first and second protocol services modules for which the capabilities data indicates an operational capability to process the subsequent outgoing message and wherein the subsequent outgoing message is not routed the subsequent outgoing message to ones of the first and second protocol services modules for which the capabilities data indicates no operational capability to process the subsequent outgoing message.

23. The computer-readable medium of claim 17, further comprising computer-executable instructions for processing an incoming message received via the computer network from a selected one of the first and second service providers, the application program interface further defining a set of data structures to support data transfer, including the incoming message, from the selected one of the first and second service providers to the user interface, and converting the incoming message received from the selected one of the first and second service providers to data defined by at least one of the data structures of the application program interface.

24. The computer-readable medium of claim 23, further comprising computer-executable instructions for receiving data related to the incoming message from the application program interface and displaying the incoming message on the display.

25. The computer-readable medium of claim 17, further comprising computer-executable instructions for maintaining a contact list containing identification data for a plurality of individuals and data related to their respective service providers.

26. The computer-readable medium of claim 25 wherein the outgoing message is designated for transmission to a first recipient coupled to the computer network via the first service provider, the computer-readable medium further comprising computer-executable instructions for using the data related to service providers to convert the outgoing message to the first communication protocol and transmitting the outgoing message using the first communication protocol to the first designated recipient.

27. The computer-readable medium of claim 26, further comprising computer-executable instructions for using the data related to service providers to convert the outgoing message to the first protocol services module for conversion to first communication protocol.

28. The computer-readable medium of claim 17 wherein the first and second service providers include first and second provider storage areas associated with the first and second service providers, respectively, to maintain first and second provider contact lists containing identification data for individuals that are subscribers to the first and second service providers, respectively, the computer-readable medium further comprising computer-executable instructions to define a data structure of the application program interface for retrieving the identification data from the first and second provider contact lists.

29. The computer-readable medium of claim 28 wherein the first service provider includes a first server associated therewith, with the first provider storage area being maintained in association with the first server, the computer-readable medium further comprising computer-executable instructions for retrieving the first provider contact list from the first server.

30. The computer-readable medium of claim 28 wherein the application program interface is executed on a local computer platform and the first provider storage area is maintained on the local computer platform, the computer-readable medium further comprising computer-executable instructions for retrieving the first provider contact list from the local computer platform.

31. The computer-readable medium of claim 28, further comprising computer-executable instructions for combining the first and second provider contact lists as a combined contact list and storing the combined contact list.

32. A method for multi-protocol messaging communication on a computer network, the method comprising:

sensing user entry of data for an outgoing message to be transmitted on the computer network;

placing the entered data in a format compatible with an application software program;

establishing a communication link with first and second service providers having first and second communication protocols, respectively;

defining a set of application program interface data structures to support data transfer, including the outgoing message, from the user interface to the first and second service providers;

converting data defined by at least one of the data structures of the application program interface to the first and second communication protocols; and transmitting the outgoing message using the first and second communication protocols to the first and second service providers.

33. The method of claim 32 wherein the outgoing message is a command from the user interface to the first and second service providers.

34. The method of claim 32 wherein the outgoing message is a status inquiry from the user interface to the first and second service providers, to obtain status data for first and second individuals coupled to the computer network via the first and second service providers, respectively.

35. The method of claim 32 wherein the first and second service providers have first and second sets of operational capabilities, respectively, and the outgoing message is a command to request capabilities data related to the first and second sets of operational capabilities.

36. The method of claim 35, further comprising routing a subsequent outgoing message from the application program interface to the at least one of the first and second protocol services modules based on the capabilities data wherein the subsequent outgoing message is routed to ones of the first and second protocol services modules for which the capabilities data indicates an operational capability to process the subsequent outgoing message and wherein the subsequent outgoing message is not routed the subsequent outgoing message to ones of the first and second protocol services modules for which the capabilities data indicates no operational capability to process the subsequent outgoing message.

37. The method of claim 32, further comprising processing an incoming message received via the computer network from a selected one of the first and second service providers, the application program interface further defining a set of data structures to support data transfer, including the incoming message, from the selected one of the first and second service providers to the user interface, and converting the incoming message received from the selected one of the first and second service providers to data defined by at least one of the data structures of the application program interface.

38. The method of claim 32, further comprising a contact list containing identification data for a plurality of individuals and data related to their respective service providers.

39. The method of claim 38 wherein the outgoing message is designated for transmission to a first recipient coupled to the computer network via the first service provider, the method further comprising using the data related to service providers to convert the outgoing message to the first communication protocol and transmitting the outgoing message using the first communication protocol to the first designated recipient.

40. The method of claim 32 wherein the first and second service providers include first and second provider storage areas associated with the first and second service providers, respectively, to maintain first and second provider contact lists containing identification data for individuals that are subscribers to the first and second service providers, respectively, the method further comprising retrieving the identification data from the first and second provider contact lists.

41. The method of claim 40 wherein the first service provider includes a first server associated therewith, with the first provider storage area being maintained in association with the first server, the method further comprising retrieving the first provider contact list from the first server.

42. The method of claim 40 wherein the application program interface is executed on a local computer platform and the first provider storage area is maintained on the local computer platform, the method further comprising retrieving the first provider contact list from the local computer platform.

43. The method of claim 40, further comprising combining the first and second provider contact lists as a combined contact list and storing the combined contact list.

* * * * *

UNITED STATES PATENT AND TRADEMARK OFFICE

CERTIFICATE OF CORRECTION

PATENT NO. : 6,549,937 B1
DATED : April 15, 2003
INVENTOR(S) : Auerbach et al.

It is certified that error appears in the above-identified patent and that said Letters Patent is hereby corrected as shown below:

Column 5,
Line 20, please delete "Usiny" and insert therefor -- Using --;

Column 9,
Line 27, please delete "MEETRNG" and insert therefor -- MEETING --

Signed and Sealed this

Fifth Day of August, 2003

JAMES E. ROGAN
*Director of the United States Patent and Trademark Office*